(12) United States Patent
Clark et al.

(10) Patent No.: US 10,793,037 B2
(45) Date of Patent: Oct. 6, 2020

(54) VEHICLE SEAT BACK

(71) Applicant: Gordon Murray Design Limited, Shalford, Surrey (GB)

(72) Inventors: Stuart Edward Clark, Crowthorne (GB); Andrew John Smith, Burgess Hill (GB)

(73) Assignee: Gordon Murray Design Limited, Shalford (GB)

( * ) Notice: Subject to any disclaimer, the term of this patent is extended or adjusted under 35 U.S.C. 154(b) by 0 days.

(21) Appl. No.: 16/301,056

(22) PCT Filed: May 11, 2017

(86) PCT No.: PCT/EP2017/061368
§ 371 (c)(1),
(2) Date: Nov. 13, 2018

(87) PCT Pub. No.: WO2017/194689
PCT Pub. Date: Nov. 16, 2017

(65) Prior Publication Data
US 2019/0184871 A1  Jun. 20, 2019

(30) Foreign Application Priority Data
May 12, 2016 (GB) .................................. 1608376.8

(51) Int. Cl.
*B60N 2/68* (2006.01)
*B60N 2/64* (2006.01)

(52) U.S. Cl.
CPC ............... *B60N 2/686* (2013.01); *B60N 2/64* (2013.01); *B60N 2/682* (2013.01); *B60N 2002/684* (2013.01)

(58) Field of Classification Search
CPC ..................................................... B60N 2/686
See application file for complete search history.

(56) References Cited

U.S. PATENT DOCUMENTS 10,239,421 B2 * 3/2019 Katoh .................... B60N 2/028
2003/0020319 A1   1/2003 Adams
(Continued)

FOREIGN PATENT DOCUMENTS

DE   102010036798 A1   2/2012
EP       1031461 A2    8/2000
(Continued)

OTHER PUBLICATIONS

International Search Report issued for PCT/EP2017/061368, dated Jul. 17, 2017.
(Continued)

*Primary Examiner* — Timothy J Brindley
(74) *Attorney, Agent, or Firm* — Westman, Champlin & Koehler, P.A.; Z. Peter Sawicki; Amanda M. Prose

(57) ABSTRACT

A seat back for a vehicle seat comprising a panel (4) and a frame structure (6, 8, 10), the frame structure being formed of two metal tubes (6, 8) having first ends joined together by a crossmember ((10) and second ends joined together by a first member to form a tapering framework which is wide at the bottom of the seat back and narrow at the top of the seat back, wherein there is no cross-bracing of the frame between the top and bottom of the seat back. The framework is mounted to the panel such that in use the second ends are positioned near the lower portion of the seat back and the first ends are positioned towards the upper portion of the seat back.

15 Claims, 3 Drawing Sheets

(56) References Cited

U.S. PATENT DOCUMENTS

| | | | | |
|---|---|---|---|---|
| 2009/0189433 | A1 | 7/2009 | Wilson et al. | |
| 2011/0241403 | A1* | 10/2011 | Yamaguchi | B60N 2/4228 |
| | | | | 297/452.31 |
| 2012/0056454 | A1* | 3/2012 | Nusret | B62J 1/28 |
| | | | | 297/215.11 |
| 2012/0187738 | A1* | 7/2012 | Gross | B60N 2/2809 |
| | | | | 297/452.1 |
| 2015/0251579 | A1 | 9/2015 | Line et al. | |
| 2015/0314501 | A1* | 11/2015 | Maslakow | B60N 2/64 |
| | | | | 297/452.18 |
| 2016/0200232 | A1* | 7/2016 | Tamura | B60N 2/80 |
| | | | | 297/452.18 |
| 2018/0319300 | A1* | 11/2018 | Festag | B29C 70/548 |

FOREIGN PATENT DOCUMENTS

| | | | | |
|---|---|---|---|---|
| EP | 3225459 | A1 * | 10/2017 | ......... B64D 11/0647 |
| FR | 2935315 | A1 | 3/2010 | |
| FR | 2985468 | A1 | 7/2013 | |
| GB | 2515576 | A | 12/2014 | |
| WO | 03/066372 | A1 | 8/2003 | |
| WO | WO-2014127355 | A1 * | 8/2014 | ............... B60N 2/22 |
| WO | 2014/207147 | A1 | 12/2014 | |
| WO | 2015/029885 | A1 | 3/2015 | |

OTHER PUBLICATIONS

Written Opinion of the International Searching Authority issued for PCT/EP2017/061368, dated Jul. 17, 2017.
Search Report issued for GB1608376.8, dated Jul. 13, 2016.

* cited by examiner

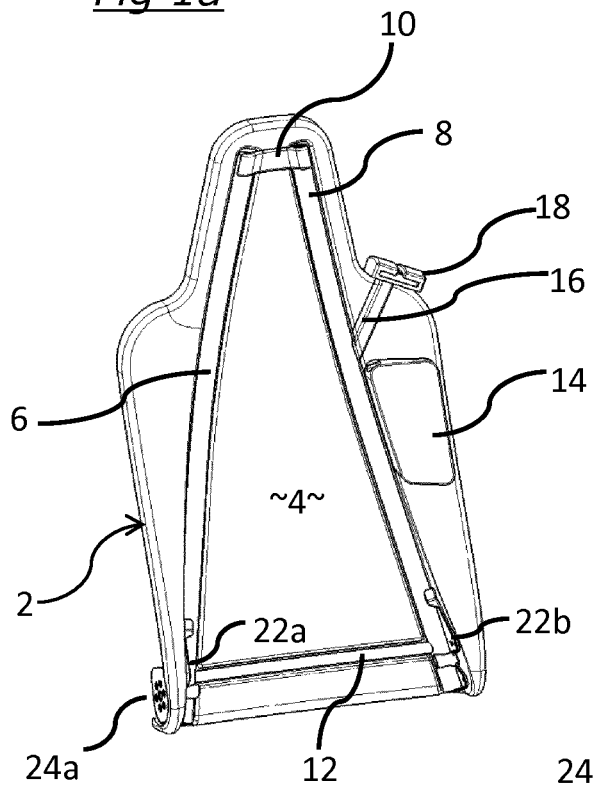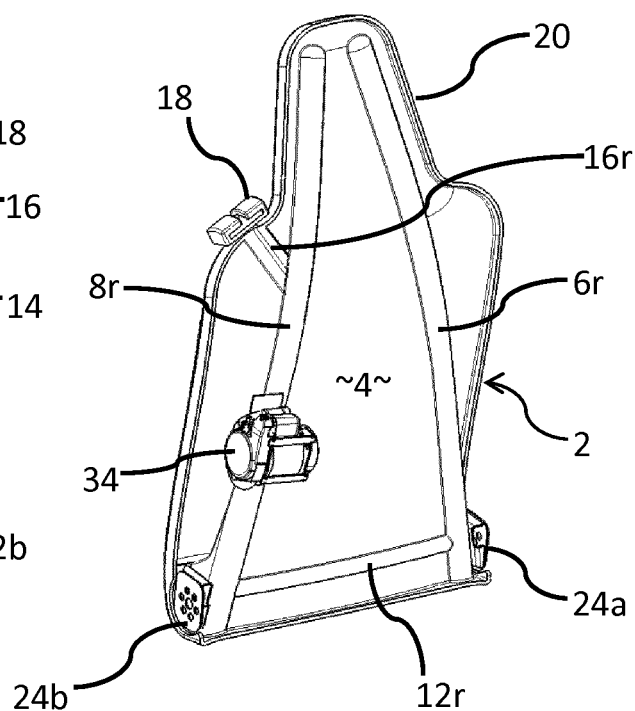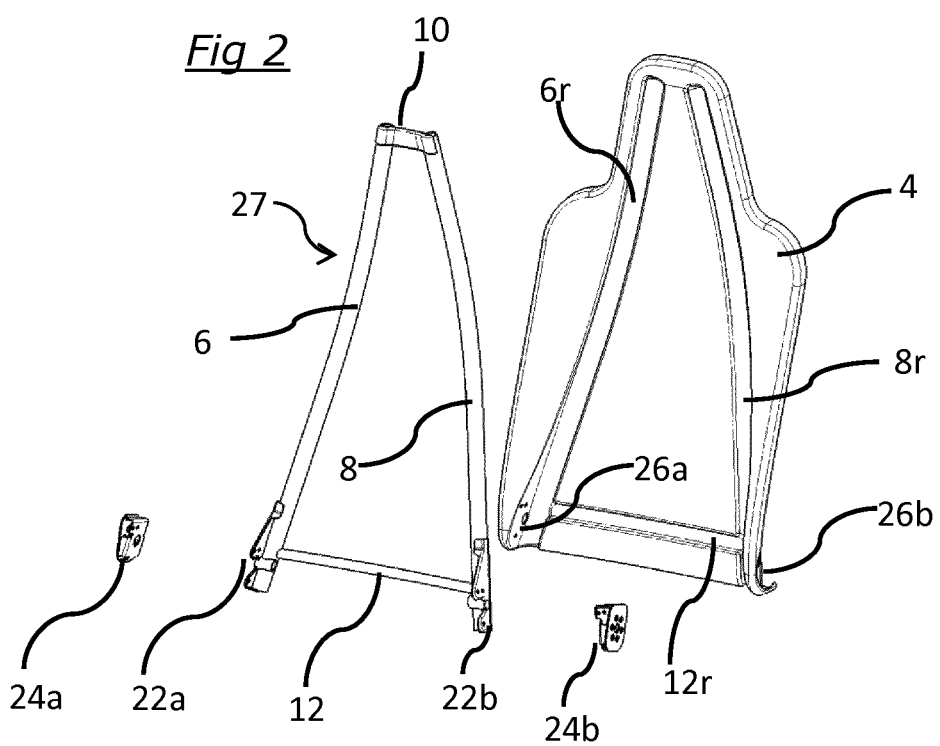

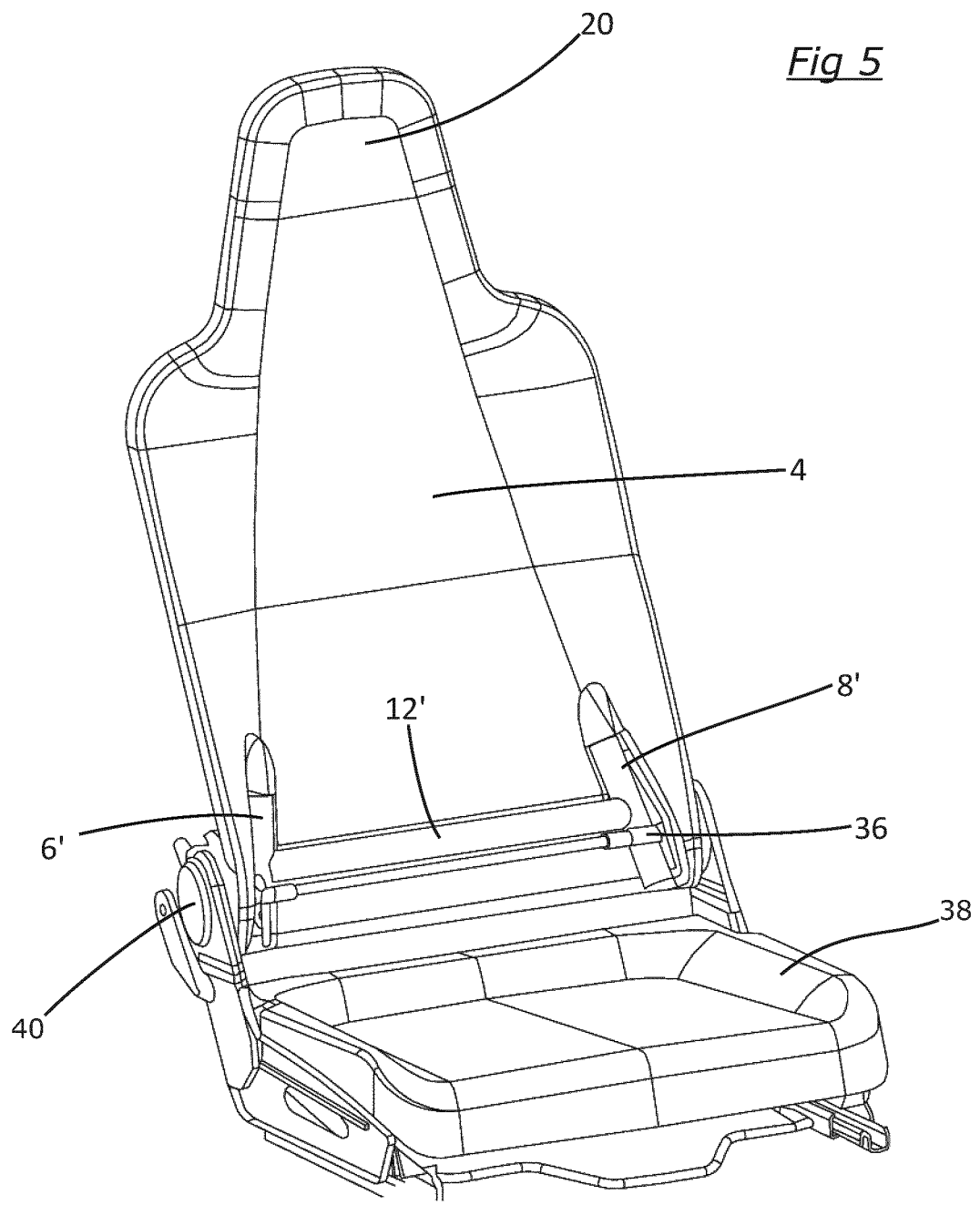

VEHICLE SEAT BACK

This application is a Section 371 National Stage Application of International Application No. PCT/EP2017/061368, filed May 11, 2017, and published as WO2017/194689A1 on Nov. 16, 2017, which claims priority to and benefits of GB Patent Application Serial No. 1608376.8, filed May 12, 2016, the entire contents of which are incorporated herein by reference.

FIELD OF THE INVENTION

The present invention relates to a seat back for a vehicle, particularly but not exclusively a compact vehicle, such as a city car or a sports car.

BACKGROUND ART

Some form of seating is essential for the driver and passengers in a car or other vehicle, to support them in comfort during the journey and restrain them in the event of a collision. This is typically a greater challenge in the design of modern smaller lightweight vehicles, as these can suffer from a lack of internal space vertically and horizontally around the occupants. There are many different designs for vehicle seats, but they generally consist of a seat base with a seat back mounted thereto. The seat base supports the buttocks and thighs of a person using the seat, and the seat back supports the person's back, from the buttocks to the shoulders, or to the back of the head. The seat back may be fixedly mounted to the seat base, in a generally upright position, or it may be pivotally mounted to the seat base, so as to be movable between an upright position and a less upright, or reclined, position.

Conventional vehicle seats for road vehicles comprise metal frames which carry springs, padding, upholstery, trim, etc. to make a seat which is both comfortable to the passenger and meets the regulatory requirements to resist point and impact loads for crash testing, whiplash, luggage strike, etc., with appropriate characteristics of strength, rigidity and so on. Such seats typically weigh between about 20-40 kg, and are costly and time-consuming to manufacture. Modern vehicles have a requirement to keep weight to a minimum, and this has led to new designs of seat which can be lighter than conventional seats, and yet still meet all the necessary regulatory requirements. One trend in modern vehicle seat design is an increasing use of composite materials (usually fibre-reinforced plastics) to reduce weight, such as in US 2015/0251579, or in our own WO 2014/207147.

US 2015/0251579 discloses a vehicle seat back comprising a pressed steel or composite frame structure which is enclosed by shaped panels of composite material, to which are then mounted cushioning and upholstery trim to form a finished seat back. WO 2014/207147 discloses an essentially unitary vehicle seat back structure, mainly formed of a composite material which is moulded in a complex shape and which includes regions of uni-directional fibre orientation for reinforcement; foam cushioning material and upholstery cover the structure to produce the finished seat back. Seat backs of the former type are lighter than traditional seat backs, though not as light as those of the latter type, but they remain expensive to manufacture, because of the complex shaping of the frame structure (which requires heavy and costly tooling, if the frame is steel, or many hours work in laying up material if the frame is a composite material) and the need to join multiple components which are of dissimilar materials. Seat backs of the latter type are significantly lighter than conventional ones, but because of the time and skill required to "lay up" fibre reinforced composites in complex shapes they are also expensive and time-consuming to manufacture; they also require additional clamping or non-composite inserts at points (such as where the structure is mounted to the seat base) which are subjected to high point loadings, which adds to time and cost.

A wide range of lightweight seats are available for motorsport applications, but are characterised by much lower levels of adjustability, comfort and accessibility so are regarded as unsuitable for use in most types of road vehicles (including urban vehicles). In addition, such seats are typically installed and used in conjunction with other safety measures such as harnesses, roll cages, helmets and the like, and are thus subject to different considerations with regard to impact testing, etc.

SUMMARY OF THE INVENTION

A seat back that offered a combination of light weight, small thickness, ease and reduced cost of manufacture, minimal material consumption and use of recycled and recyclable materials, while also being designed to pass crash testing and other regulatory requirements, would be highly desirable.

The present invention therefore provides a seat back for a vehicle seat, comprising a panel and a support structure, the support structure comprising at least two upright tubular members, joined by a cross-member, the panel comprising a composite moulded section, wherein the upright tubular members are bonded to the panel with each tubular member extending from a respective lower corner of the seat back, thereby to provide an attachment point for the seat back at that lower corner. This arrangement provides an exceptionally lightweight seat which is nevertheless capable of meeting regulatory requirements. The tubular members accept point loadings at the seat fixing points and transfer those loads across the bonded joints to the seat back panel.

The panel can be formed with at least two recesses, each shaped and configured to receive one of the upright tubular members, each recess extending from a respective lower corner of the seat back. Such an arrangement, in particularly in combination with tubular members that are circular in cross-section, provides a very secure anchoring of the tubular members within the panel and thus a good transfer of forces from the support structure to the panel.

The attachment point ideally permits rotational attachment, thereby to allow the seat back angle to vary, and is preferably located below the cross-member for additional mechanical stability. The cross-member is preferably also a tubular section.

The panel can also include an integral headrest.

To provide additional mechanical strength in in contexts where compliance with luggage impact regulations is necessary, the upright tubular members can have their upper ends joined together to form a tapering framework which is wide at the bottom of the seat back and narrow at the top of the seat back, such as in a substantially triangular shape, which provides the necessary mechanical properties with no need for cross-bracing of the frame between the top and bottom of the seat back. Preferably the upper ends of the two tubes are joined by a second member which is short relative to the cross-member. In use the seat back can extend between an upper portion located adjacent the shoulders and/or head of a person sitting on the seat and a lower portion located adjacent the buttocks of the person sitting on the seat, the tubular members being mounted to the panel such that in use the second ends are positioned near the lower portion of the seat back and the first ends are positioned towards the upper portion of the seat back.

The structure of the present invention is simple, it requires minimal investment in tooling and can be easily, quickly and cheaply manufactured; its main elements, the tubes and one (or two) cross members only, can be designed so that the frame is sufficiently strong to not require heavy cross-bracing (vertical or horizontal), whilst the triangular shape allows the seat back to be mounted to a seat base wide enough apart to fit an average occupant of the seat and also provide good torsional rigidity. The finished seat back is a one-piece structure, which is formed of just two elements, the tubular sections and the panel. Seat backs in accordance with the invention are lighter in weight compared with traditional pressed steel and sprung seatback designs that can resist the same loads, and the seat back can be made thinner than with conventional designs, which benefits overall vehicle packaging, particularly where space is at a premium. The panel fills in the spaces between the elements making up the frame, to make a more complete former for the cushioning, etc., but more importantly surrounds the frame and adds strength and rigidity to the seat back. The tubes and members can be of the same material, such as a metal or alloy, and so can be inexpensively made using traditional materials, in stock sizes, using straightforward techniques and requiring no specialised and costly tooling. The seat back would be supplied with cushioning, padding and upholstery, etc. in the normal manner to produce a lightweight seat back which has the necessary characteristics to meet the various regulatory requirements e.g. ECE R17 (seat back luggage test). Because the design of the structure is so simple, the effects of any planned adjustments to it (so as to make the seat back wider or narrower, or taller or shorter, or to make it of a different material) can be easily modelled to ensure that the modified seat back will still meet all regulatory requirements.

The panel may have a generally concave shape, and the tubular members a complementary concave shape, so as to comfortably accommodate the back of a person occupying the seat. The tubular members can be mounted to either side of the concave panel, though we prefer to mount it to the concave surface of the panel as this ensures that the tubular parts can be fully enclosed by the panel and the cushioning/upholstery, which is aesthetically superior, and protects the tubes from the environment (and, for example, from rust if the tubes are metallic); the framework is located between the panel and the back of a person occupying the seat, so some cushioning is desirable to cover the framework and ensure the seat back is comfortable. If the frame is mounted to the concave surface of the panel, the reverse surface of the panel (i.e. its convex surface) can be manufactured with a surface finish which is of acceptable quality and/or appearance and so will not require any separate trim or covering, which further reduces overall seat weight. The concave surface would be covered in use, so would not require any special finish.

The panel may comprise recesses which are shaped and configured so as to allow the tubular members to at least partially fit within the recesses, and the inner surfaces of the recesses may be shaped and configured so as to correspond, follow and conform to the outer surfaces of the tubes and form a complementary interface between the inner surfaces of the recesses and the outer surfaces of the tubes, so the tubes fit within the recesses. This complementary shaping and configuration has aesthetic advantages, and makes it clear in the manufacturing process how a tubular members is to be assembled to a panel. An adhesive is applied to one or both of the tubular members and the panel recesses to bond the two with a layer of adhesive which is sandwiched in the interface region between the surfaces of the tubes and the recesses. The tubes and the recesses may be curved so that the recesses each curve closely around that part of a tube to which the recess is bonded.

The thickness of the panel in the regions forming the recesses in the panel can be less than the thickness of the remainder of the panel away or distant from the recesses. This is possible because where the tubes and the panel are bonded, the tubes reinforce the panel. Thus less panel material is required to provide the required local strength and rigidity, and it means that the assembled seat back is thinner than it would otherwise be in the vicinity of the tubular members. Tubes of curved cross-section and complementarily curved recesses allow the bond surface to be optimised whilst keeping the size (cross-sectional area) of the tubes small.

Mountings may be provided on the tubes, at or near their second or lower ends, so that the tubular members can be mounted to the seat base to complete the seat. The provision of two mountings at the outer edges of the bottom of the seat back allow for a secure mounting of the seat back to the seat base. The mountings may be integrally formed with the tubes, or fixed to them, and there may be additional fixtures adapted to cooperate with the mountings to complete the mounting to the seat base and/or to clamp and/or reinforce areas of the panel. The mountings and/or fixtures may be designed to allow the seat back to pivot relative to a seat base, so that the seat may be adjusted between "upright" or "reclined" positions, and/or a suitable recline mechanism can be fitted between the seat back and the seat base. The provision of two mountings allows secure mounting of the seat back to the seat base whatever the angle of recline or uprightness of the seat back. The mountings and fixtures are preferably metallic, to provide "hard points" which are better able to bear point loads than are most composite materials.

The panel may be a sheet of a composite material, comprising a first layer such as a fibre reinforced plastics or resinous material, a central layer of core material, such as paper or plastics honeycomb or foam, with a final surface layer of a material such as a fibre reinforced plastics or resinous material such as a glass or carbon or recycled carbon fibre reinforced, plastics or resinous material. It will be understood that the amounts and disposition of the different materials making up the composite panel can be varied so as to give the requisite strength, rigidity, lightness of weight and compact size. The tubes and the first and/or second members may be metallic, for example steel or aluminium, or an alloy, or they may be a composite, for example fibre-reinforced resin or plastics, the fibre could be, for example, glass, carbon or recycled carbon. The tubes may be the same size and/or shape, which makes the manufacture of the structure for a seat back simpler and cheaper. The panel may be unitary, so that panels can be easily and inexpensively manufactured, in a single moulding, for example, or it could comprise several smaller parts joined together; it could also have other items mounted to it.

BRIEF DESCRIPTION OF THE DRAWINGS

The invention will now be described by way of example and with reference to the accompanying figures, in which;

FIGS. 1a and 1b are perspective views, from the front and rear respectively, of a seat back in accordance with a first embodiment of the present invention;

FIG. 2 is a simplified, exploded view of the seat back of FIG. 1a;

FIG. 3 is a perspective view of a modified version of the seat back of FIG. 1a,

FIG. 5 is a perspective view of a second embodiment of the present invention.

DETAILED DESCRIPTION OF THE EMBODIMENTS

Figure 3:
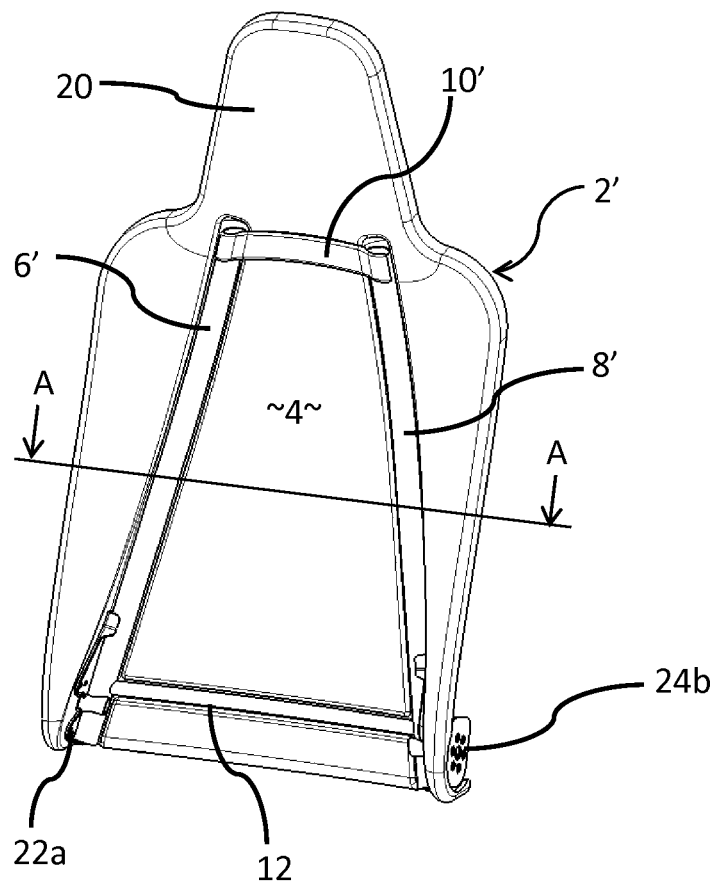

FIG. 1a shows the structure of a seat back 2 in accordance with the invention, looking at the front, concave surface of the seat back which in use would support a person's back; FIG. 1a shows the rear of the same seat back 2, from the convex side. FIG. 2 shows some of the same elements as are illustrated in FIG. 1a, but "exploded". The seat back 2 comprises a shaped composite panel 4, formed of three layers: two outer layers comprising fibre reinforced plastic and a paper honeycomb core. A frame structure 27 (see FIG. 2) is formed of left and right metal tubes 6, 8 of circular cross-section which are joined at their upper ends and near their lower ends by upper and lower cross members 10, 12, and has no further elements such as cross-bracing, because the frame structure 27 and the panel 4 are mutually reinforcing. Upper member 10 is a metal stamping and lower member 12 is a straight rod or tube, the two members being welded to the tubes 6, 8 to form a tapering structure which looks a little like a stretched A-frame; the tubes 6, 8 are curved so that the triangular tapering structure matches the curve of the panel 4. The panel is formed with elongate recesses having curved inner surfaces (best shown in FIG. 2) to receive parts of the frame structure 27. When the frame structure 27 is mounted to the panel 4, tube 6 fits in recess 6r, tube 8 fits in recess 8r, and lower member 12 fits in recess 12r (no recess is shown, or needed, for upper member 10 as this is located away from the panel 4, on the front surfaces of the tubes). The frame is mounted to the panel by bonding the surfaces of the frame which are seated within the recesses, as will be described further below. The panel 4 extends beyond the frame on all sides of the general plane of the frame. Metal brackets 22a, 22b are welded to the lower ends of the tubes 6, 8 to provide metallic mounting points for additional metal fixtures 24a, 24b. These are provided to engage with the brackets 22a, 22b via bosses so as to avoid clamping of the composite panel 4 to avoid torque relaxation. These fixtures 24a and 24b provide the hard points at which the seat back 2 is mounted to the seat base (not shown).

Other elements which are shown in FIGS. 1a and 1b are: a side airbag 14, which is fitted to the frame structure 27 or panel 4 on one side of the seat back 2 (usually on the outer side of the seat, closest to the vehicle door); a guide 18 to receive and support a seat belt (not shown) where it passes over the edge of the panel 4, the guide being mounted on a metal support arm 16 which is welded to tube 8 and received in recess 16r, and an inertia reel seat belt mechanism 34 mounted to the same tube 8 carrying the support arm 16. The seat belt mechanism 34 can therefore be mounted directly to the seat back 2 without affecting occupant comfort, and the exact location and/or orientation on the tube 8 can be changed easily to suit different requirements, for example where there are space restrictions, where it is not possible to mount the mechanism to the vehicle structure behind the seat, or where there are moving parts to be avoided (such as in a vehicle with a convertible roof).

Referring now to FIG. 3, a modified version of the seat back 2' is shown in which the tubes 6', 8' are shorter than in the previous drawings, and do not extend into the headrest portion 20 of the seat back (and nor do the recesses for tubes 6', 8'). This reduces the length of the tubes (but requires a slightly longer upper member 10') and so makes the seat back 2' lighter, but the headrest portion can still be capable of resisting head and/or luggage impact loads as regulations require. If needed, the fixed headrest portion 20 could be removed so that the upper edge of the seat back 2' is at the level of the arrow denoting reference 2' in the drawing. If a headrest is still required, a headrest could be provided (not shown), having downwardly extending support arms which could be attached to the upper member 10'. If this attachment allowed the support arms to slide relative to the member 10' in the vertical direction, the headrest could be made height adjustable.

Figure 4:
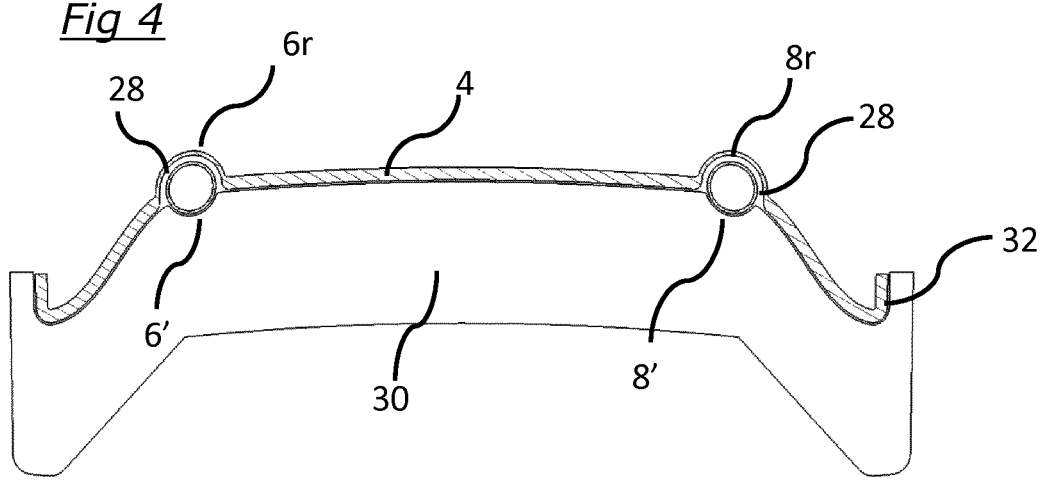
FIG. 4 is a cross-sectional view along lines AA in FIG. 3.

FIG. 4 shows a cross-section along lines AA in FIG. 3. Recesses 6r, 8r are curved in a shape which is complementary to the outer surfaces of the tubes 6', 8', so that the tubes are a snug fit within the recesses, so as to produce a gap or interface between the two of between about 1 mm and about 3 mm; the interface between the recess and the tube is filled with a bonding agent or adhesive 28 to provide a permanent bond between the tubes and the panel 4, and to produce a rigid and strong structure. Insetting the tubes into recesses in the composite panel increases the interface width and hence the available bonding surface. We have found that, for example, for circular steel of 20 mm diameter, a bond width of about 30 mm is sufficient to provide the necessary strength and rigidity, so the bonding agent need not necessarily extend as far as is shown in the drawing. The extent of the bond 28 can also be changed if the strength of the bonding agent is varied. Those skilled in the art will appreciate that the size and/or cross-sectional shape of the tubes 6', 8' could be increased or reduced, and the complementary size and/or shape of the recesses 6r, 8r varied to match, so as to change the extent by which the recesses protrude from the rear of the panel (thus making the rear of the seat back smoother), and/or the extent by which the tubes protrude from the front of the panel, provided that sufficient bonding is provided to give the necessary structural characteristics. The more the tubes are wholly contained within the recesses, so that less of the tube protrudes forwardly from the general plane of the panel, the less cushioning is required to make the seat back comfortable for an occupant. The recesses could be such that the forward edge of the tubes is level with the general plane of the panel. It will be noted that the thickness of the panel 4 at the recesses 6r, 8r is less than the panel thickness elsewhere; this is because the panel is a sandwich structure, consisting of outer layers of reinforced composite with an inner paper core in a transverse arrangement like a honeycomb, the core being compressed where the recesses are formed. This can also be used to make the rear of the seat back smoother by varying the thickness of the core either side of the tubes 6, 8. Also shown in FIG. 4 is a lip 32 extending around the edge of the seat back, which increases the stiffness of the panel 4, and is helpful for mounting trim, or upholstery (not shown), for locating the edge of foam cushioning 30 which covers the tubes 6', 8' and makes the seat back 2 comfortable in use, for helping surround the periphery of the frame structure 27 and for strengthening the sides of the seat where they protrude forwardly of the general plane of the panel 4 (such as at the sides of the seat back 2 near its base, where the structure can extend further than shown to form bolsters which "wrap around" or partially enclose the outside of an occupant of the seat and provide support when the vehicle is cornering). The seat back in accordance with the invention is designed so as to be light and thin, and is primarily intended for a sports car or city vehicle where space and or lightness are important considerations; however, it could be used in seats for other types of vehicle where the same considerations also apply, such as other types of road vehicle or automotive, or aircraft.

FIG. 5 shows an alternative seat back design, suited to some two-seat vehicles (for example), which do not need to meet luggage impact requirements as (depending on the design of the vehicle) there will not be any luggage behind them. The tubes 6', 8' are significantly shorter and extend only a little way into the seat back 4'. They are joined by a cross-member 12', in this case approximately halfway up their height. We greatly prefer that the cross-member 12' is above the pivot point 36, however, as it can then provide rigidity to the tubes 6', 8'.

The shorter upright tubular sections 6', 8' of FIG. 5 fit into recesses in the panel in the same way as the embodiment of FIGS. 1 to 4, and are secured in place via an adhesive join. However, the shorter length reduces the overall weight of the seat, at a cost of mechanical strength that is not needed in some contexts. As with the first embodiment, the tubular sections 6', 8' extend into the lower corners of the seat back and provide an attachment point allowing the seat back to be mounted to the vehicle or (as in this case) to the seat base 38. The necessary fixings 40 can be secured to the tubular sections 6', 8', allowing rotation of the seat back around a pivot axis 36 so that the seat back angle can be chosen. Forces in use or under an impact are transmitted via the fixings through the tubular sections and then to the panel in a manner that avoids point loads.

It will of course be understood that many variations may be made to the above-described embodiments without departing from the scope of the present invention. For example, the drawings illustrate a panel 4 and tubes 6, 8 which are curved, though they could be straight; the tubes are generally longitudinal, with curves in two orthogonal directions. The tubes could be curved in three dimensions for more complex designs. The tubes can be identical in shape, so as to minimise the number of different parts which need to be manufactured, or they can be "handed", so as to fit one or other side of the panel. The shape and/or size of the entire tube can vary as described above; additionally or alternatively the shape and/or size of the tube can be different at different points along the length of the tube—this would make manufacture more difficult and therefore more costly, but could allow seat back strength, size or weight to be tailored to a particular design requirement. The tubes shown are circular in cross-section, but they could be any shape, such as oval or other curved outline, or square or triangular or other straight sided profile (even if such shapes might not be so easily bent to the desired curved shape) or a combination of curved and straight edges when seen in cross-section. The diameter and/or thickness of the tube members can be varied so as to adjust the strength and/or torsional rigidity of the seat back. The upper cross member shown is stamped metal, because this is easily formed and can be attached easily to the upper ends of the tubes by welding or bonding (and more easily than the lower cross member is welded to the lower ends of the tubes), but it could also be made in the form of a rod or tube, or it could be applied to the rear of the tubes, adjacent the panel (in which the panel would require a suitable recess for it to fit into). Whilst we prefer a panel which is a composite sandwich of fibre reinforced resin enclosing a paper or cardboard "honeycomb" core, or a foamed plastic core, because this allows a rigid yet light and compact panel to be produced, the panel could instead be solid, and/or it may have apertures which are sized and positioned so as to reduce the overall weight whilst not reducing the panel's structural integrity. The outline of the tubular framework, which is wide at the bottom and converges to a narrower top end is dictated by the respective lengths of the upper and lower cross members; it will be appreciated that the lengths of these members can be varied so as to make the seat back broader or narrower than shown, and/or to adjust the strength and/or torsional rigidity of the seat back. Where different variations or alternative arrangements are described above, it should be understood that embodiments of the invention may incorporate such variations and/or alternatives in any suitable combination.

The invention claimed is:

1. A seat back for a vehicle seat comprising a panel and a support structure,
   the support structure comprising at least two upright tubular members, joined near their lower ends by a cross-member to form a tapering framework which is wide at the bottom of the seat back and narrow at the top of the seat back,
   the panel comprising a composite moulded section,
   wherein the upright tubular members are bonded to the panel with each tubular member extending from a respective lower corner of the seat back, thereby to provide an attachment point for the seat back at that lower corner.

2. The seat back according to claim 1 in which the panel is formed with at least two recesses, each shaped and configured to receive one of the upright tubular members, each recess extending from a respective lower corner of the seat back.

3. The seat back according to claim 1 in which the tubular members are circular in cross-section.

4. The seat back according to claim 1 in which the attachment point permits rotational attachment thereby to allow the seat back angle to vary.

5. The seat back according to claim 4 in which the attachment point is located below the cross-member.

6. The seat back according to claim 1 in which the cross-member is a tubular section.

7. The seat back according to claim 1 in which the panel includes an integral headrest.

8. The seat back according to claim 1 in which the upright tubular members have their upper ends joined and wherein there is no cross-bracing between the tubular members between the cross-member near the lower ends of the tubular members and below the upper ends of the tubular members.

9. The seat back according to claim 1 wherein the upper ends of the two tubes are joined by a second member which is short relative to the cross-member.

10. The seat back according to claim 1 wherein the panel has a generally concave shape.

11. The seat back according to claim 1, wherein inner surfaces of the recesses are shaped and configured so as to correspond, follow and conform to the outer surfaces of the tubular members and form a complementary interface between the inner surfaces of the recesses and the outer surfaces of the tubular members.

12. The seat according to claim 1, wherein the thickness of the panel in the regions forming the recesses in the panel is less than the thickness of the remainder of the panel.

13. The seat back according to claim 1 wherein the panel is a sheet of composite material.

14. The seat back according to claim 1 wherein the panel comprises a first layer, a second, core layer and a third layer.

15. The seat back according to claim 14 in which the core layer is paper and/or honeycomb and/or foam.

* * * * *